United States Patent [19]

Kamoshita et al.

[11] Patent Number: 4,730,299
[45] Date of Patent: Mar. 8, 1988

[54] DEVICE FOR PREVENTING VIBRATION OF A DISC MOTOR SHAFT IN A DISC PLAYBACK DEVICE

[75] Inventors: Yasuhiko Kamoshita; Kazuo Urata; Mikio Ogusu, all of Hamamatsu, Japan

[73] Assignee: Nippon Gakki Seizo Kabushiki Kaisha, Hamamatsu, Japan

[21] Appl. No.: 870,094

[22] Filed: Jun. 3, 1986

[30] Foreign Application Priority Data

Jun. 5, 1985 [JP] Japan .................. 60-84818[U]
Jun. 6, 1985 [JP] Japan .................. 60-85579[U]

[51] Int. Cl.$^4$ .................................................. G11B 3/60
[52] U.S. Cl. ...................................... 369/264; 384/517
[58] Field of Search ............... 369/269, 270, 271, 264; 384/517, 563, 620

[56] References Cited

U.S. PATENT DOCUMENTS

| | | | |
|---|---|---|---|
| 3,047,297 | 7/1962 | Drake | 369/269 |
| 4,157,185 | 6/1979 | Mayer | 369/269 |
| 4,256,312 | 3/1981 | Ikeda | 369/269 |
| 4,328,575 | 5/1982 | Elliott | 369/269 |
| 4,499,573 | 2/1985 | Morinaga | 369/270 |

*Primary Examiner*—Steven L. Stephan
*Attorney, Agent, or Firm*—Spensley Horn Jubas & Lubitz

[57] ABSTRACT

In a disc playback device of a type in which a turntable is connected to a disc motor shaft, a device for preventing vibration of the disc motor shaft comprises magnetic biasing means for generating a magnetic force biasing the disc motor shaft in an axial or radial direction of the shaft. The magnetic biasing means is constructed by securing one of magnetic substance and a magnet to the turntable and disposing the other below the turntable or securing one of two magnets to the turntable and disposing the other magnet below the turntable. For preventing vibration of the disc motor shaft in the radial direction, a yoke plate is fixed to the magnet in such a manner that a part of the yoke plate is positioned on the lateral side of the magnetic substance or the other magnet.

14 Claims, 15 Drawing Figures

DEVICE FOR PREVENTING VIBRATION OF A DISC MOTOR SHAFT IN A DISC PLAYBACK DEVICE

BACKGROUND OF THE INVENTION

This invention relates to a device for preventing vibration caused to a rotation shaft of a disc drive motor for rotating a disc in a disc playback device.

In a disc playback device for playing back a disc such as a laser disc and a disc of the Compact Disc Digital Audio System, a turntable on which a disc is placed and rotated is connected to a rotation shaft of a disc drive motor and the disc is driven by a system called a direct drive system.

The disc drive motor used for this type of disc playback device is generally so constructed that there is room for its rotation shaft to move in both radial and axial directions. In this type of disc playback device, therefore, the rotation shaft of the disc drive motor sometimes vibrate radially or axially during playing back of a disc with a result that the disc is radially or axially displaced. If the disc playback device is of a type which reads signals recorded on the disc by an optical system, and excessive load is applied to a tracking servo system or a focusing servo system of the device so that there is the likelihood that accurate reading of signals can no longer be achieved.

Figure 5:
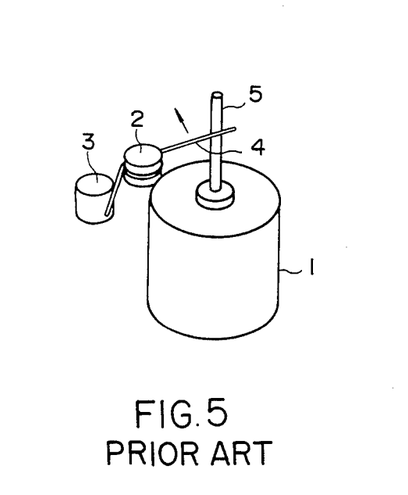
FIGS. 5 and 6 are schematic perspective views of the prior art side pressure imparting devices.
Figure 6:
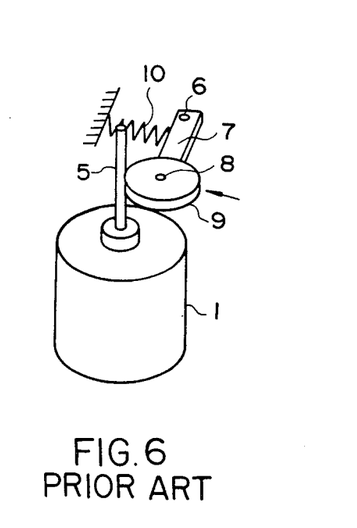

For eliminating the disadvantage caused by the vibration of the rotation shaft of the disc drive motor in radial direction, there have been provided devices for imparting a side pressure to the rotation shaft as shown in FIGS. 5 and 6.

The prior art side pressure imparting device shown in FIG. 5 includes a disc drive motor 1, a fixed pin 2 and an engaging member 3 provided in the vicinity of the disc drive motor 1. A spring 4 is wound on the fixed pin 4 and one end portion of this spring 4 is on abutting engagement with the engaging member 3 and the other end of the spring 4 is in abutting engagement with a rotation shaft 5 of the motor 1. According to this device, a side pressure is imparted to the rotation shaft 5 by the urging force of the spring 4.

The prior art side pressure imparting device shown in FIG. 6 includes an arm 7 provided in the vicinity of the disc drive motor 1 which are 7 is pivotable horizontally about a pin 6. A roller 9 is mounted in the forward end portion of the arm 7 so that it is rotatable about a pin 8. The arm 7 is pulled by a spring 10 to press the roller 9 against the rotation shaft 5 of the motor 1. According to this device, a side pressure is imparted to the rotation shaft 5 by the pressing force of the roller 9.

These prior art devices aim at preventing undesired displacement, i.e., vibration, in the radial direction of the rotation shaft 5 of the motor 1 by imparting a side pressure to the rotation shaft 5. These devices, however, have the disadvantage that, since the spring 4 or the roller 9 is in abutting engagement with the rotation shaft 5, vibration applied to the spring 4 or the roller 9 from outside of the device is directly transmitted to the rotation shaft 5 so that the rotation shaft 5 tends to be adversely affected by the vibration transmitted from outside of the device. Besides, when the devices have been used for a relatively long time, portions of the rotation shaft 5, the spring 4 and the roller 9 which are in contact with each other are worn away with resulting deterioration in the side pressure imparting function.

For preventing vibration of the rotation shaft in the axial direction, it is conceivable to achieve it by increasing accuracy of machining of the disc drive motor components. It is actually not possible to eliminate the vibration in the axial direction totally by this approach.

Figure 7:
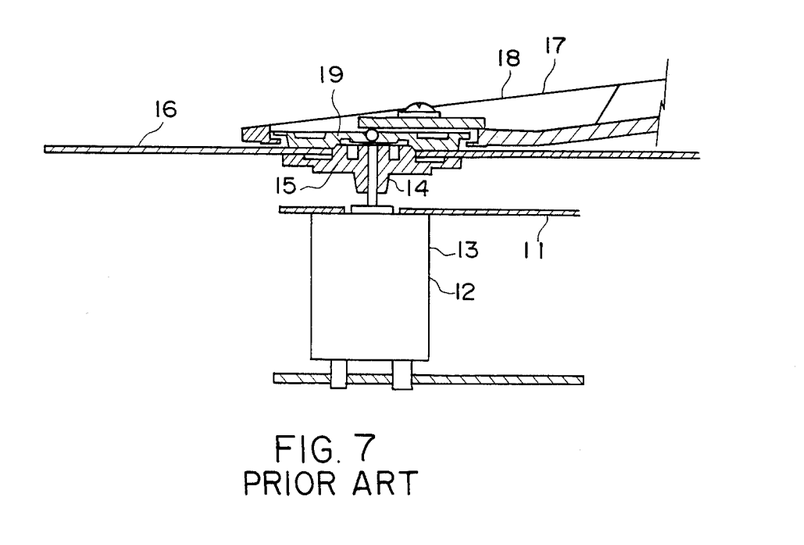
FIG. 7 is a vertical sectional view of an essential portion of the prior art disc playback device including the device for preventing vibration of the disc motor shaft in the axial direction.

A device as shown in FIG. 7 has previously been proposed in the U.S. patent application Ser. No. 658,226 by the same assignee. In FIG. 7, reference numeral 11 designates a chassis. A main body 13 of a disc drive motor 12 projects downwardly from the lower surface of the chassis 11. A turntable 15 is connected to a rotation shaft 14 of the motor 12 projecting upwardly from the upper surface of the chassis 11. Above the turntable 15, there is provided a clamper 17 for clamping a disc 16 between it and the turntable 15 when the disc 16 is placed on the upper surface of the turntable 15. In the clamper 17, a rotary plate 19 is rotatably supported on the lower surface of the forward end portion of a clamper main body 18. The clamper 17 is normally spaced from the turntable 15 and, when the disc 16 has been placed on the disc 16, the rotary plate 19 is urged downwardly by force of an unillustrated spring to clamp the disc 16 on the turntable 15. According to this disc playback device, since the disc 16 and the turntable 15 are urged downwardly by the clamper 17 when the disc 16 has been placed on the turntable 15, the rotation shaft 14 also is urged downwardly so that vibration of the rotation shaft 14 in the axial direction can be prevented.

In this prior art disc playback device in which axial displacement of the rotation shaft 14 is made by the urging force of the clamper 17, vibration applied to the clamper 17 from outside is directly transmitted to the rotation shaft 14 so that the rotation shaft 14 tends to be adversely affected by the vibration applied from outside.

SUMMARY OF THE INVENTION

It is, therefore, an object of the invention to provide a device for preventing vibration of a disc motor shaft in a disc playback device which can realize prevention of vibration of the motor shaft without being affected by vibration applied from outside of the device.

The device for preventing vibration of a disc motor shaft in a disc playback device achieving the above described object of the invention is characterized in that the device comprises a disc motor having a disc motor shaft, a turntable fixedly connected to the disc motor shaft for placing a disc thereon, and magnetic biasing means for generating a magnetic force biasing the disc motor shaft in a predetermined direction.

In one aspect of the invention, the predetermined direction in which the disc motor shaft is biased is an axial direction of the disc motor shaft. In another aspect of the invention, the predetermined direction is a radial direction of the disc motor shaft.

For preventing vibration of the disc motor shaft in the axial direction, the magnetic biasing means may comprise magnetic substance and a magnet one of which is secured to the lower surface of the turntable and the other of which is provided below the turntable. The magnetic biasing means may alternatively comprise a magnet secured to the lower surface of the turntable and another magnet provided below the turntable in such a manner that the magnets attract each other. The magnet biasing means may also be constructed by forming the turntable with magnetic substance and provided a magnet below the turntable.

In a preferred construction of the device according to the invention, a yoke plate is secured to the magnet of the magnetic biasing means for effectively utilizing flux of the magnet.

For preventing vibration of the disc motor shaft in the radial direction, the magnetic biasing means may comprise magnetic substance and a magnet one of which is secured to the lower surface of the turntable and the other of which is provided below the turntable and a yoke plate secured to the magnet, a part of the yoke plate being positioend on the lateral side of the magnetic substance. Alternatively, the magnetic biasing means may comprise a magnet secured to the lower surface of the turntable, another magnet provided below the turntable in such a manner that the magnets attract each other and a yoke plate secured to one of the magnets, a part of the yoke plate being positioned on the lateral side of another magnet.

According to the invention, an anxial and/or radial biasing force is applied to the disc motor shaft to which the turntable is connected by the magnetic biasing means without providing any element which is in contact with the turntable. Accordingly, the disc motor shaft is constantly urged in the axial and/or radial direction so that vibration of the disc motor shaft can be effectively prevented without being affected by vibration applied from outside of the device. Moreover, aging or deterioration in the function for generating the force biasing the disc motor shaft in the predetermined direction never occurs in the device according to the invention.

A preferred embodiment of the invention will now be described with reference to the accompanying drawings.

BRIEF DESCRIPTION OF THE DRAWINGS

In the accompanying drawings,

FIGS. 1 through 4 show an embodiment of the invention in which;

FIGS. 8 through 13 show an example of entire construction of a disc playback device to which the present invention is applied in which;

DESCRIPTION OF A PREFERRED EMBODIMENT

FIGS. 1 through 4 show an embodiment of the present invention. In these figures, an essential portion of the disc playback device incorporating the device for preventing vibration of the disc motor shaft and a part of components of the device are illustrated.

Figure 1:
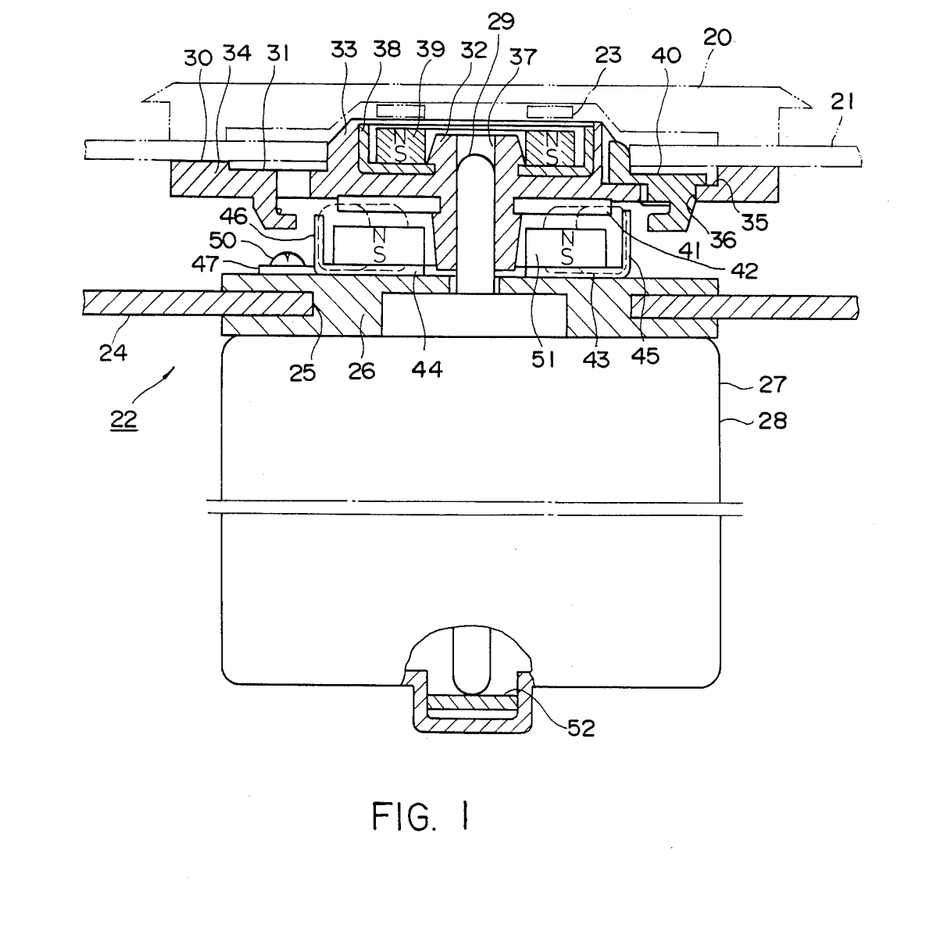
FIG. 1 is a vertical sectional view of an essential portion of the disc playback device incorporating the device according to the invention.
Figure 2:
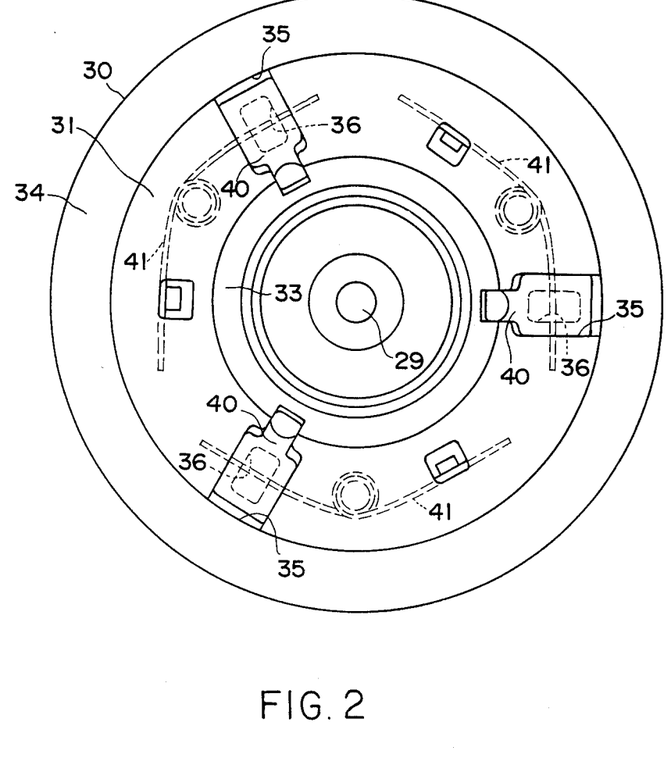
FIG. 2 is a plan view of the device.

The disc playback device described herein is of a type in which a disc is housed in a disc cartridge case and this disc cartridge case is loaded in a main body of the disc playback device. Referring to FIGS. 1 and 2 illustrating an essential portion of the device, reference numeral 20 denotes a disc stabilizer disposed in a disc cartridge case (not shown), reference numeral 21 a disc housed in the case and reference numeral 22 a main body of the device. The entire construction and operation of the disc playback device will be described later with reference to FIGS. 8 through 13.

The disc stabilizer 20 has a magnetic substance ring 23 secured to the bottom surface thereof and holds the disc 21 in association with a turntable 30 when the disc 21 is placed on the turntable 30. Detailed description about the turntable 30 will be made later.

A chassis 24 of the main body 22 is formed with an opening 25 and a mounting member 26 formed by outsert forming is secured fixedly to the peripheral portion of the opening 25. A main body 28 of a disc drive motor 27 is secured to the lower surface of the mounting member 26. A rotation shaft (i.e., disc motor shaft) 29 of the motor 27 penetrate through the mounting member 26 and projects upwardly from the upper surface of the mounting member 26. The turntable 30 is connected to the upper end portion of the rotation shaft 29.

The turntable 30 is integrally formed by synthetic resin and has a generally disc-like configuration. A main body 31 of the turntable 30 is formed in its central portion with a vertically projecting mounting portion 32. A center spindle portion 33 is formed on the main body 31 on the outside of the mounting portion 32. A disc placing portion 34 is formed on the upper surface of the outermost peripheral portion of the main body 31. The main body 31 is formed also with recesses 35, 35, 35 and openings 36, 36, 36 on the outside of the spindle portion 33. The mounting portion 32 is a cylindrical wall portion with its inner surface constituting a mounting opening 37 for the rotation shaft 29 of the motor 27.

A yoke plate 38 consisting of magnetic substance and formed by insert forming is fixedly secured on the upper surface of the main body 31 of the turntable 30. A magnet ring 39 is bonded on the upper surface of the yoke plate 38. Disc centering members 40, 40, 40 are disposed in the recesses 35, 35, 35 and the openings 36, 36, 36 in such a manner that these members 40, 40, 40 are displaceable radially of the turntable 30. The disc centering members 40, 40, 40 are urged radially outwardly of the turntable 30 by springs 41, 41, 41. These disc centering members 40, 40, 40 engage in the central opening of the disc 21 when the disc 21 is placed on the turntable 30 and thereby function to position the disc 21 accurately in the center of the turntable 30.

An annular magnetic substance plate 42 made of magnetic substance and formed by insert forming is fixedly secured on the lower surface of the main body 31 of the turntable 30.

Figure 3:
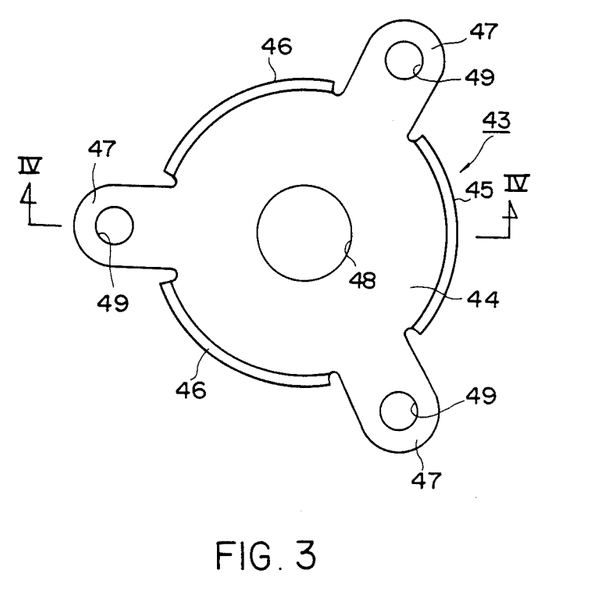
FIG. 3 is a plan view of the yoke plate.
Figure 4:
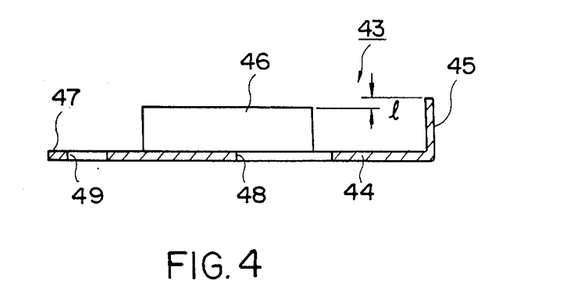
FIG. 4 is a sectional view taken along lines IV—IV in FIG. 3.

A yoke plate 43 made of magnetic substance is fixedly secured on the upper surface of the mounting member 26. The yoke plate 43 has, as shown in FIGS. 3 and 4, a disc-like main plate 44, three yoke pieces 45, 46, 46 projecting upwardly at the outer peripheral portion of the main plate 44 and three connecting members 47, 47, 47 extending radially outwardly of the main plate 44 in portions between the projecting yoke pieces 45, 46, 46. The main plate 44 is formed in its central portion with an opening 48 and the connecting members 47, 47, 47 are formed in the foremost end portions thereof with openings 49. The projecting yoke pieces 45, 46, 46 are disposed at equal distances therebetween along the outer periphery of the main plate 44. Among these projecting yokes pieces, the projecting yoke piece 45 is higher than the other projecting yoke pieces 46, 46 by 1 as shown in FIG. 4. The main plate 44 of the yoke plate 43 is disposed on the upper surface of the mounting member 26 with the rotation shaft 29 positioned in the opening 48. Screws 50 are inserted in the openings 49 of the connecting members 47 and the yoke plate 43 is fixed to the mounting member 26 by fastening these screws 50 against the mounting member 26. The upper end portion of the projecting yoke piece 45 is positioned on one lateral side of the outer peripheral surface of the magnetic substance plate 42 whereas the upper end portions of the projecting yoke pieces 46, 46 are positioned obliquely downwardly of the outer peripheral surface of the magnetic substance plate 42. On the upper surface of the mainplate 44 of the yoke plate 43 is bonded an annular magnet 51. The magnet 51 is magnetized so that it has poles in its upper and lower end portions.

In mounting the disc 21 on the disc playback device of the above described construction, the disc cartridge case housing of the disc 21 is brought to a position above the turntable 30 and then lowered towards the turntable 30. As the disc cartridge case is lowered towards the turntable 30, the turntable 30 enters the inside of the disc cartridge case through a turntable insertion opening (not shown) formed in the disc cartridge case. The center spindle portion 33 of the turntable 30 therefore enters the central opening of the disc 21 and the disc 21 is placed on the disc placing portion 34 of the turntable 30. In this mounting operation, the disc stabilizer 20 positioned above the disc 21 has its magnetic substance ring 23 fixed on the lower surface thereof attracted by the magnet 39 and the yoke plate 38 and thereby presses the disc 21 downwardly. The disc 21 thereby is held between the turntable 30 and the disc stabilizer 20.

By starting the disc drive motor 27 in this state, a pickup head (not shown) starts picking up signals recorded on the disc 21.

In the disc playback device of the above described construction, undesired vibration of the rotation shaft 29 of the disc drive motor 27 in the axial and radial directions which may occur in playing back of the disc 21 can be prevented in the following manner.

In the above described device, a magnetic circuit is formed between the magnet 51 and the yoke plate 43 disposed on the upper surface of the mounting member 26 and the magnetic substance plate 42 secured fixedly on the lower surface of the turntable 30 in such a manner that the flux of the magnet 51 passes from the magnet 51 to the projecting yoke pieces 45, 46, 46 of the yoke plate 43 via the magnetic substance plate 42 and returns to the magnet 51 via the main plate 44 of the yoke plate 43. In this magnetic circuit, the projecting yoke piece 45 functions to attract the magnetic substance plate 42 in one lateral direction. The turntable 30 and the rotation shaft 29 thereby are subjected to a side pressure acting in this one lateral direction. The rotation shaft 29 therefore is always pressed in its one side portion to one side surface of a bearing (not shown) of the motor 27 so that free radial movement of the rotation shaft 29 is prohibited. Further, in the magnetic circuit described above, the magnet 51 and the projecting yoke pieces 45, 46, 46 function to attract the magnetic substance plate 42 downwardly. The turntable 30 and the rotation shaft 29 thereby are subjected to the downwardly acting force. The rotation shaft 29 therefore is always pressed to the upper surface of a thrust bearing 52 provided in the lower end portion of the main body 28 and free axial movement of the rotation shaft 29 is prohibited. Since the magnetic substance plate 42, the yoke plate 43 and the magnet 51 in the magnetic circuit are disposed between the turntable 30 and the mounting member 26 which are both made of synthetic resin, an amount of flux leaking outside of the magnetic circuit is held at the minimal so that the flux of the magnet 51 can be utilized most effectively.

Thus, according to the device according to the invention, no vibration in the radial or axial direction takes place in the rotation shaft 29 of the motor 27. Accordingly, even if vibration is applied to the device during the playback of the disc 21, the disc 21 is rotated always in its predetermined position relative to the pickup head picking up the signals recorded on the disc 21 and therefore likelihood of occurrence of tracking and focusing errors will be eliminated.

The device according to the invention is also effective for preventing running out of lubricant oil between the rotation shaft 29 and a bearing (not shown) of the motor 27 supporting the rotation shaft 29 in a case where the bearing is constituted by an oilless metal bearing. The oilless metal bearing contains lubricant oil and this lubricant oil seeps out by contacting of a rotation shaft with the bearing. In this device in which the rotation shaft 29 is always in pressing contact with the bearing, the lubricant oil contained in the bearing always fills the space between the rotation shaft 29 and the bearing and therefore running out of the lubricant oil particularly at the start of rotation of the motor 27 with a resulting seizure of the rotation shaft 29 to the bearing can be prevented.

In the above described embodiment, the magnetic substance plate 42 made of magnetic substance is fixed on the side of the turntable 30, the magnet 51 is provided below the turntable 30 and the yoke plate 43 is fixed to the magnet 51 with a part of the yoke plate 43 being positioned on the lateral side of the magnetic substance plate 42. Alternatively, relative arrangement of these magnetic substance, magnet and yoke plate may be such that a magnet is fixed on the side of the turntable 30, magnetic substance is provided below the turntable 30 and a yoke plate is fixed to the magnet with a part of the yoke plate being positioned on the lateral side of the magnetic substance.

Alternatively, the arrangement may be such that a magnet is fixed to the turntable 30 and another magnet is provided below the turntable 30 in such a position that the two magnets attract each other and a yoke plate is fixed to at least one of these magnets with a part of the yoke plate being positioned on the lateral side of the opposite magnet. Further alternatively, instead of fixing a magnetic substance plate or a magnet to the turntable 30, the turntable itself may be formed of magnetic substance and a magnet may be provided below the turntable.

For better understanding of the invention, the entire construction of the disc playback device will be described hereinbelow with reference to FIGS. 8 through 13. It should be noted that this entire construction is disclosed also in copending U.S. patent applications Ser. Nos. 781,768, 781,751 and 813,533 by the same assignee.

FIGS. 8 through 13 show an example of the disc playback device in the form of a Compact Disc Player.

The disc playback device (Compact Disc player) to be described below comprises a disc cartridge case C housing a disc (Compact Disc) and a main body D. The disc is housed in the disc cartridge case C and this disc cartridge case C is loaded in the main body D and the disc is played back in a state in which it is housed in the disc cartridge case C.

Figure 8:
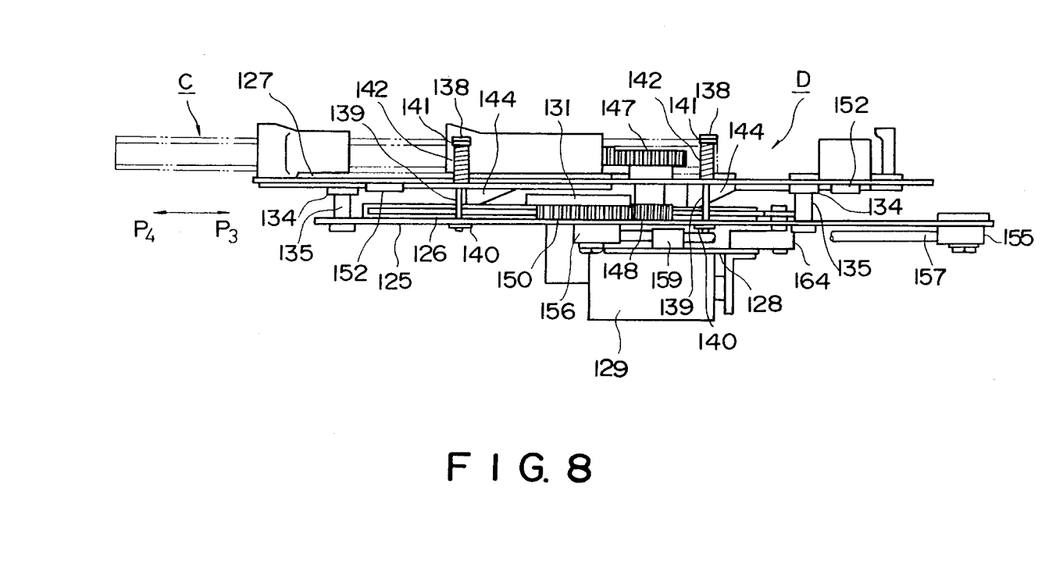
FIG. 8 is a side view of the disc playback device.
Figure 13A:
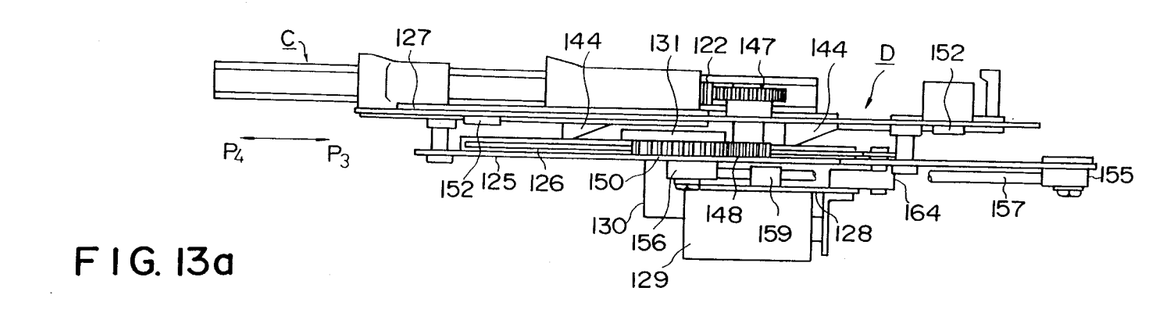
FIGS. 13a, 13b and 13c are side views of the same device illustrating different states of operation of the device.
Figure 13B:
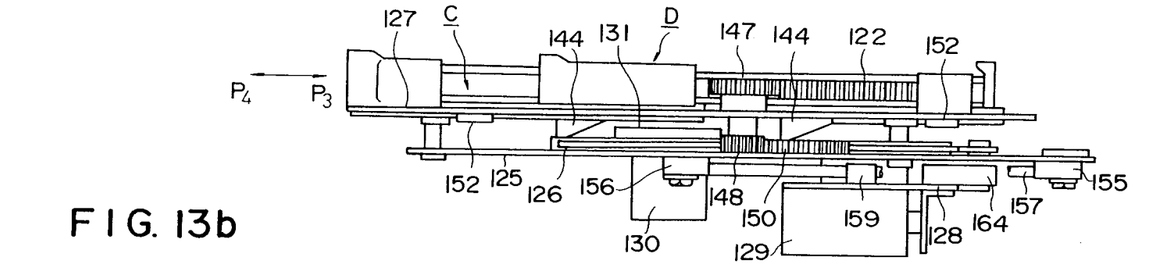
Figure 13C:
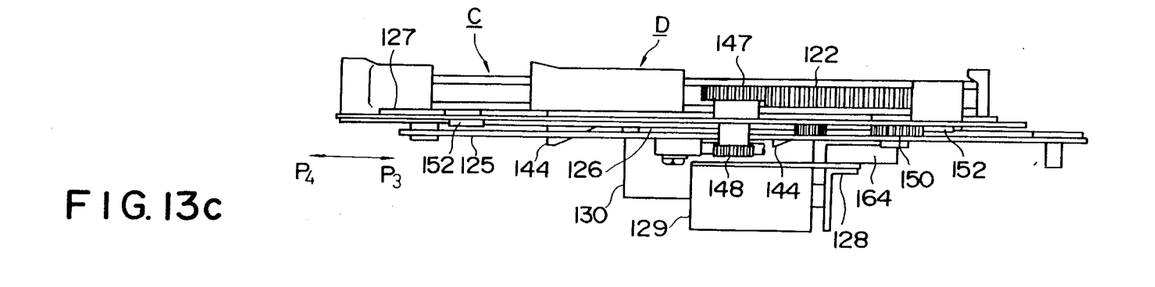

The disc cartridge case C houses a disc 121 rotatably therein. As shown in FIGS. 8 and 13, a rack 122 is provided on one side of the disc cartridge case C for loading the case C in the main body D and a disc stabilizer 124 is provided undetachably on the upper surface of the inside of the case C for rotatably holding the disc 121.

The construction of the main body D will now be described. Referring to FIGS. 8 through 11, above a chassis 125 there are provided a carrier 126 and a holder 127 and below the chassis 125, there is provided an optical pickup head 129.

Figure 9:
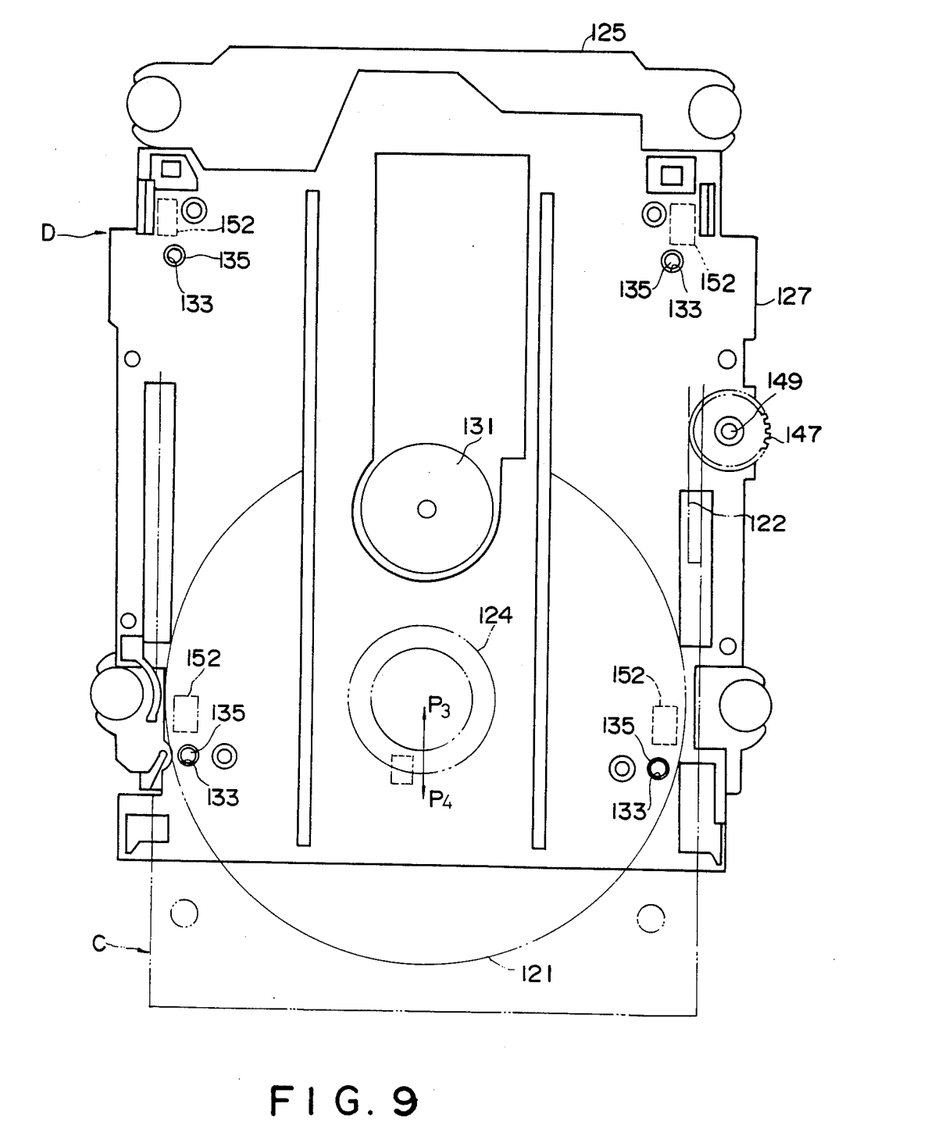
FIG. 9 is a plan view of the same device.
Figure 11:
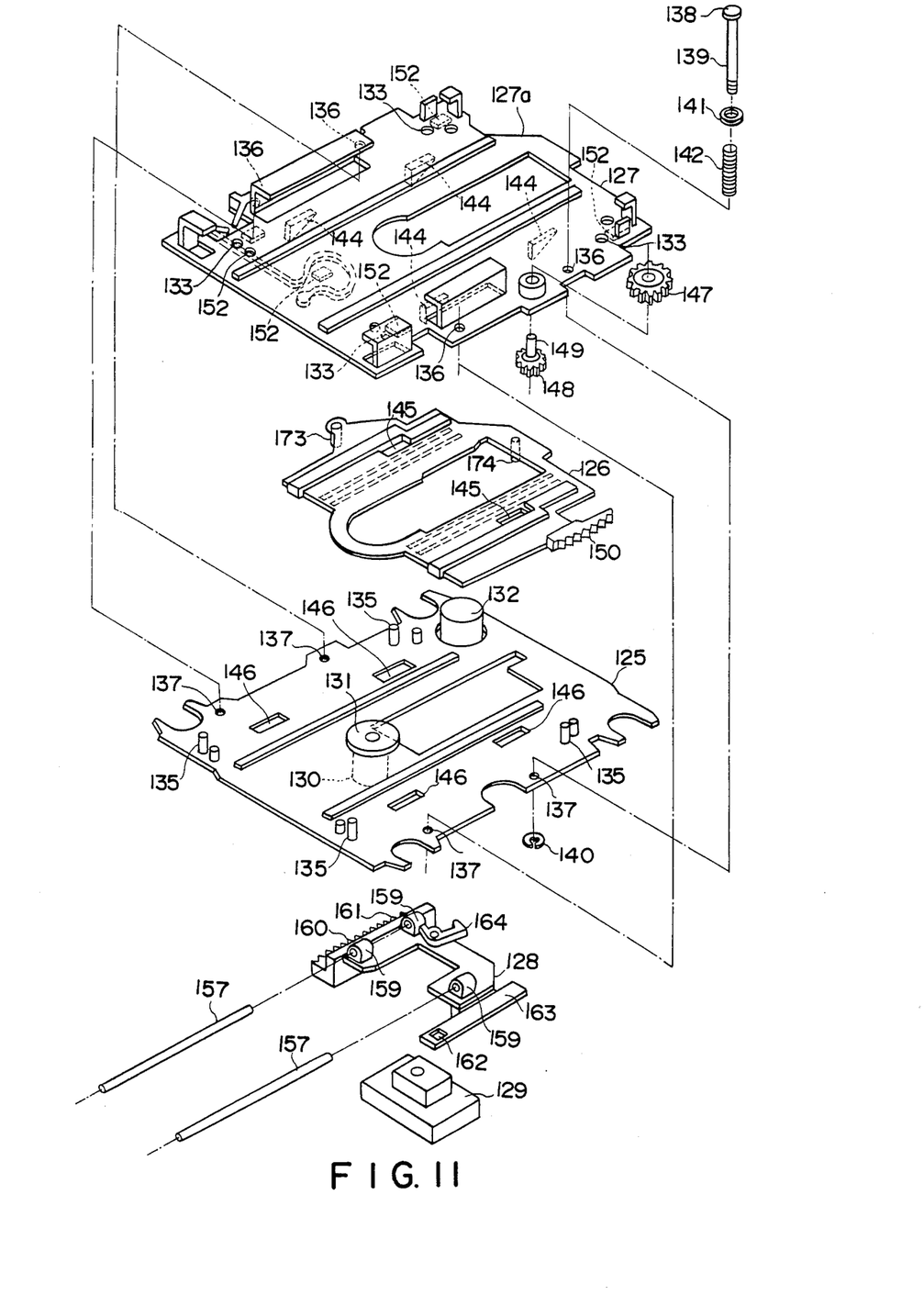
FIG. 11 is an exploded view of the device.

A disc driving motor 130 is mounted on the lower surface of the chassis 125 and a turntable 131 is mounted on the rotaion shaft of this motor 130 projecting upwardly through the chassis 125. On this turntable 131 is attached a magnetic substance or a magnet (not shown) which is attracted to a magnet or a magnetic substance (not shown) attached to the disc stabilizer 124 when the disc 121 has been mounted on the turntable 131, as will be described more fully later. A feed loading motor 132 is secured to one end portion of the chassis 125 in such a manner that its rotation shaft is projecting downwardly. The carrier 126 is disposed on the upper surface of chassis 125 and is movable in directions of arrows P3 and P4. The holder 127 is disposed above the upper surface of the chassis 125 with the carrier 126 disposed therebetween and is vertically movable relative to the chassis 125. The holder 127 is formed in the respective corners thereof with guide members 134, 134 ... having location pin guide openings 133, 133 ... as shown in FIGS. 8, 9 and 11 by the outsert forming. Location pins 135, 135 ... are fixedly secured to the respective corners of the chassis 125 with their upper end portions being inserted in the location pin guide openings 133, 133 ... . Owing to this structure, the holder 127 moves vertically along the location pins 135, 135 .... The holder 127 is formed in its side edge portions with openings 136, 136 whereas the chassis 125 is formed in locations corresponding to these openings 136, 136 ... with openings 137, 137 .... Pins 139 having head portions 138 are inserted through the corresponding openings 136, 136 ... and 137, 137 .... Retainers 140 are attached to the end portions of these pins 139, 139 ... projecting downwardly from the chassis 125 and washers 141 engaging with the head portions 138 are attached to the end portions of these pins 139, 139 ... projecting upwardly from the chassis 125. Coil springs 142 are provided between the washers 141 and the holder 127, urging the holder 127 downwardly. The holder 127 is in its upper-most position when cams 144, 144 ... formed on the lower surface of the holder 127 are in abutting engagement with the upper surface of the carrier 126 and is moved downwardly by the urging force of the coil springs 142, 142 ... when the cams 144, 144 ... have entered openings 145, 145 ... formed in the carrier 126 and openings 146, 146 ... formed in the chassis 125. A shaft 149 to which a loading pinion 147 and a carrier pinion 148 are fixedly secured is rotatably supported on the holder 127. The carrier pinion 148 is in mesh with a rack 150 provided on the carrier 126.

In the above described construction, when the head base 128 has been moved as will be described later, the carrier 126 is moved in association with this head base 128 in the directions of arrows P3 and P4 thereby causing the holder 127 to be moved upwardly and downwardly and the loading pinion 147 to be rotated. During the playback of the disc 121, the holder 127 holds the disc cartridge case C housing the disc 121 and places the disc 121 on the turntable 131. During loading and ejecting of the disc cartridge case C, the loading pinion 147 meshes with the rack 122 of the disc cartridge case C and thereby moves the disc cartridge case C in the directions of arrows P3 and P4.

The chassis 125 and the holder 127 are formed by cutting steel plates which are magnetic substance to predetermined shapes.

Magnetic attraction generating means is provided on the chassis 125 and the holder 127 for clamping the holder 127 in position in associating with the coil springs 142, 142 ... when the holder 127 holding the disc cartridge case C has been moved downwardly to a position in which the holder 127 enables the disc 121 to be played back. More specifically, magnets 152, 152 ... in the form of an oblong plates are bonded by adhesive on the lower surface of the holder 127 in respective corners and in the front end portion. Each of the magnets 152 is magnetized so that it has poles in the upper and lower end portions thereof. The portions of the chassis 125 opposing these magnets 152, 152 ... are formed in flat surfaces so that these portions of the chassis 125 are attractable to the magnets 152, 152 .... When the holder 127 is in the lowermost position, flux of each of the magnets 152 passes from the magnet 152 to the chassis 125 through the holder 127 and returns from the chassis 125 to the magnet 152. By the formation of this magnetic circuit, the magnets 152 attract the chassis 125 thereby clamping the holder 127 in position securely and preventing an undesired vertical movement of the holder 127. In this lowermost position of the holder 127, a small gap l is defined between the magnets 162 and the chassis 125 so as to enable the holder 127 to move easily when it is displaced from the chassis 125.

Figure 10:
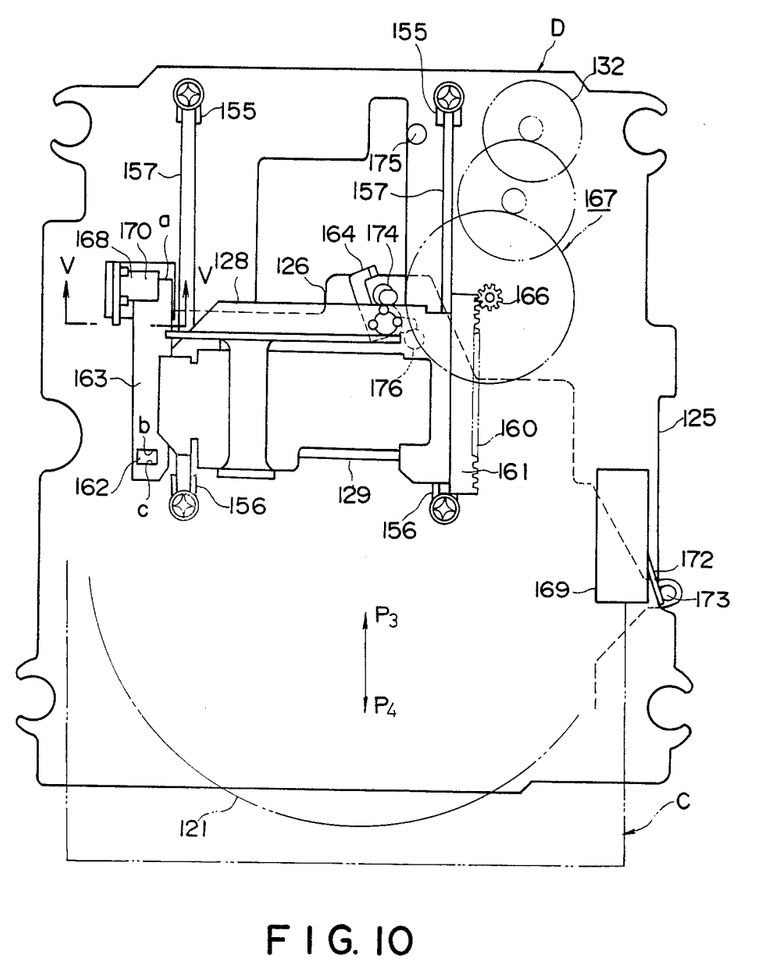
FIG. 10 is a bottom view of the same device.
Figure 12:
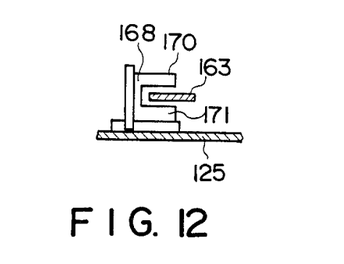
FIG. 12 is an exploded view taken along lines V—V in FIG. 10.

As shown in FIGS. 8 and 10, guide bar mounting blocks 155, 155, 156, 156 are provided on the lower surface of the chassis 125 and guide bars 157, 157 are mounted between the guide bar mounting blocks 155 and 156 in a direction parallel to the directions of arrows P3 and P4. The head base 128 is mounted on the guide bars movably in the directions of arrows P3 and P4. As shown in FIGS. 10 and 11, the head base 128 is provided in its left and right upper surface portions with mounting blocks 159, 159, 159, in its one side portion with a member 161 having a feed loading rack 160, in its other side portion with a slit plate 163 having an opening 162, in one end portion of its upper surface with an engaging hook 164 and in its central portion with the pickup head 129. On the lower surface of the chassis 125, there are provided a feed loading pinion 166 which meshes with the feed loading rack 160 of the head base 128, a gear train 167 for transmitting the rotation of the feed loading motor 132 to the pinion 166, a photo-coupler 168 for detecting the position of the head base 128 and a microswitch 169 for detecting insertion of the disc cartridge case C in the holder 127. The photo-coupler 168 is disposed in such a manner that, as shown in FIGS. 10 and 12, its light-emitting section 170 and its light-receiving section 171 are opposed to each other with the slit plate 163 being interposed therebetweeen. This photo-coupler 168 detects the position of the head base 128 by detecting passing or interruption of light between the light-emitting section 170 and the light-receiving section 171 when the rear edge a of the slit plate 163 and edges b and c of the opening 162 have been moved to the space between these sections 170 and 171. The photo-coupler 168 thereby detects the lead-in and lead-out positions of the disc 121, completion of the loading operation and completion of the overstroke movement of the head base 28 to be described later. The microswitch 169 is so constructed that its actuator 172 abuts against a pin 173 provided on the carrier 126 and detects disengagement of the pin 173 from the actuator 172 thereby detecting the insertion of the disc cartridge case C in the holder 127.

In the above described construction, when the feed loading pinion 166 is driven and rotated, the head base 128 whose rack 160 is in mesh with the pinion 166 is moved in the directions of P3 and P4 and the optical pickup head 129 thereby is moved in the diametrical direction of the disc 121 in a region beneath the disc 121 placed on the turntable 131. At this time, the carrier 126 is moved in the direction of arrow P3 or P4 by abutting engagement of a carrier pin 174 fixedly secured on the carrier 126 with the head base 128 or engagment of the carrier pin 174 with the engaging hook 164. When the head base 128 has been moved in the direction of arrow P3 or P4, an end portion of the engaging hook 164 is engaged with a pin 175 or 176 fixedly secured on the chassis 125 in the end sections of the movements of the head base 128 and the engaging hook thereby is rotated into engagement with or disengagement from the carrier pin 174.

The operation of the disc playback device during playback of the disc will now be described.

In a standby state before the disc cartridge case C is inserted, the main body D is in a state shown in Fig. 13a in which the carrier 126 has moved in the direction of arrow P4 and the holder 127 is in its uppermost position (the non-playback position of the disc 121) with the lower edges of the cams 144, 144 . . . being in abutting engagement with the upper surface of the carrier 126. The head base 128 also is in a position in which it has moved to the direction of arrow P4. The pin 173 of the carrier 126 is in abutting engagement with the actuator 172 of the microswitch 169. The carrier pinion 148 is in mesh with the rack 150.

For playing back the disc 121, the disc 121 is loaded in the disc cartridge case C and this disc cartridge case C is manually inserted into the holder 127 of the main body D. In this manual operation, the disc cartridge case C is inserted in the direction of arrow P3 as shown in FIG. 13a to a position in which the foremost end portion of the rack 122 of the case C comes into meshing engagement with the loading pinion 147 and this loading pinion 147 thereby is slightly rotated. The slight rotation of the loading pinion 147 is transmitted to the carrier pinion 148 through the shaft 149 and the rack 150 which is in mesh with the carrier pinion 148 is moved in the direction of arrow P3 thereby causing the carrier 126 to be moved by a small distance in the same direction. This movement of the carrier 126 causes the pin 173 to be disengaged from the actuator 172 of the microswitch 169 shown in FIG. 10 whereby the microswitch 169 is turned on.

As the microswitch 169 is turned on, the feed loading motor 132 is switched on through an operation of an unillustrated control circuit and the rotation of the feed loading motor 132 is transmitted to the feed loading pinion 166 through the gear train 167. The rotation of the pinion 166 causes the feed loading rack 160 which is in mesh with the pinion 166 to be moved in the direction of arrow P3 and the head base 128 thereby is moved in the same direction. The movement of the head base 128 in the direction of arrow P3 causes the rear edge of the head base 128 to push the carrier pin 174 in the direction of arrow P3 thereby moving the carrier 126 in the direction of arrow P3. As the carrier 126 is moved in the direction of arrow P3, the carrier pinion 148 which is in mesh with the rack 150 is rotated and the loading pinion 147 is simultaneously rotated. The rotation of the loading pinion 47 causes the disc cartridge case C to be moved in the direction of arrow P3 as shown in FIG. 13B. As the disc cartridge case C is moved and the disc 121 housed therein approaches the region above the turntable 131, the cams 144, 144 . . . of the holder 127 gradually enter the openings 145, 145 . . . of the carrier 126 and the openings 146, 146 . . . of the chassis 125 and the holder 127 thereby is moved downwardly. As the holder 127 is moved downwardly, the turntable 131 enters in a relative movement into the disc cartridge case C through an opening (not shown) formed in the disc cartridge case C and holds the disc 121 housed in the case C. At this time, the disc 121 is disposed in a space between the disc stabilizer 124 of the case C located above the central portion of the disc 121 and the turntable 131 located beneath the central portion of the disc 121 and is held securely between the disc stabilizer 124 and the turntable 131 with the aid of magnetic attraction between the magnet mounted on the turntable 131 and the disc stabilizer 124 of magnetic substance. When the holder 127 has reached its lowermost position (the playback position of the disc 121) as shown in FIG. 13c, the carrier pinion 148 is disengaged from the rack 150 and the rotation of the loading pinion 147 thereby is stopped.

In the above operation, the holder 127 having reached its lowermost position is held in position by the coil springs 142, 142 . . . in association with the magnetic attraction generating means. More specifically, the holder 127 is held on the carrier 126 by the urging force of the coil springs 142, 142 . . . . In addition, the magnets 152, 152 . . . fixedly secured to the holder 127 attract the chassis 125 by the formation of the magnetic circuit through the magnets 152, the holder 127 and the chassis 125 thereby holding the holder 127 in position. Thus, the holder 127 is clamped in its lowermost position by the coil springs 142, 142 . . . and the magnetic attraction generating means. In particular, the magnetic attraction increases in inverse proportion to the square of relative distance so that the magnetic attraction generating means imparts a sufficient force to clamp the holder 127 and effectively prevents an undesired vertical movement of the holder 127 even when vibration is applied from the outside of the device.

When the loading operation of the disc cartridge case C has been completed, the head base 128 is moved to the rear end portions of the guide bars 157, 157. At this time, the photo-coupler 168 detects passing of the side edge b of the opening 162 formed in the slit plate 163 and thereby detects completion of the loading operation. Upon detection of the completion of the loading operation by the photo-coupler 168, the motor 132 is reversely rotated an the head base 128 starts movement in the direction of arrow P4. Since the head base 128 is not engaged with the carrier 126 at this time, the carrier 126 is not moved in association with the head base 128. The head base 128 only is moved and the optical pickup head 129 reaches the lead-in position of the disc 121. Thereupon the photo-coupler 168 detects passing of the rear edge a of the slit plate 163 and the motor 132 thereby is stopped and the head base 128 stops its movement.

The disc playback device is not in a state in which the disc 121 can be played back. When a playback command is given to the device, the disc driving motor 130 is rotated to turn the disc 121 with the turntable 131. In the meanwhile, the feed loading motor 132 which provides driving force for the feed operation causes the head base 128 to start to move in the direction of arrow P3. A signal reading section of the optical pickup head 129 on the head base 128 reads a signal recorded on the disc 121 through a laser beam inlet (not shown) formed in the disc cartridge case C whereby the playback of the disc 121 is performed.

When the signal reading section of the optical pickup head 129 has read a lead-out position signal recorded on the disc 121, or the photo-coupler 168 has detected passing of the edge b of the opening 162 formed in the slit plate 163, or an eject command has been given to the device, the feed loading motor 132 causes the head base 128 to move further in the direction of arrow P3 in an overstroke movement. In the course of the overstroke movement of the head base 128 in the direction of P3, the engaging hook 164 mounted on this head base 128 comes into abutting engagement with the pin 175 on the chassis 125 and is pushed and rotated by the pin 175 into engagement with the carrier pin 174 of the carrier 126. When the head base 128 has further moved to an end position of the overstroke movement, the photo-coupler 168 detects passing of the edge c of the slit plate 163. Upon detection by the photo-coupler 168 of the end position of the overstroke movement of the head base 128, the feed loading motor 132 is reversely rotated and the head base 128 is moved in the direction of arrow P4 with the carrier 126 hooked by the engaging hook 164. Thus, the disc cartridge case C is returned to its initial position in the reverse order to the loading operation. In the vicinity of the end point of the reverse movement, the engaging hook 164 abuts against the pin 176 on the chassis 125 and is pushed and rotated thereby into disengagement from the carrier pin 174 of the carrier 126. In the end point of the reverse movement, the pin 173 of the carrier 126 engages with the actuator 172 of the microswitch 169. Thus, all component parts of the device are returned to their initial state whereby the eject operation is completed.

In the upward movement of the holder 127 during the eject operation also, the magnetic attraction clamping the holder 127 decreases in inverse proportion to the square of relative distance and, accordingly, once the holder 127 starts to move away from the chassis 125, the holder 127 can subsequently be released readily from the chassis 125.

What is claimed is:

1. A device for preventing vibration of a disc motor shaft in a disc playback device comprising:
   a disc motor having a rotatable disc motor shaft;
   a turntable fixedly connected to said disc motor shaft for placing a disc thereon; and
   magnetic biasing means for generating a magnetic force biasing said disc motor shaft in a predetermined direction other than rotational to prevent vibration of the disc motor shaft with respect to the disc motor.

2. A device for preventing vibration of a disc motor shaft as defined in claim 1 wherein said predetermined direction is an axial direction of said disc motor shaft.

3. A device for preventing vibration of a disc motor shaft as defined in claim 1 wherein said predetermined direction is a radial direction of said disc motor shaft.

4. A device for preventing vibration of a disc motor shaft as defined in claim 2 wherein said magnetic biasing means comprises magnetic substance and a magnet one of which is secured to the lower surface of said turntable and the other of which is provided below said turntable.

5. A device for preventing vibration of a disc motor shaft as defined in claim 4 wherein a yoke plate is secured to said magnet.

6. A device for preventing vibration of a disc motor shaft as defined in claim 2 wherein said magnetic biasing means comprises a magnet secured to the lower surface of said turntable and another magnet provided below said turntable in such a manner that said magnets attract each other.

7. A device for preventing vibration of a disc motor shaft as defined in claim 6 wherein a yoke plate is secured to said magnet.

8. A device for preventing vibration of a disc motor shaft biasing means is constructed by forming said turntable with magnetic substance and providing a magnet below said turntable.

9. A device for preventing vibration of a disc motor shaft as defined in claim 2 wherein a yoke plate is secured to said magnet.

10. A device for preventing vibration of a disc motor shaft as defined in claim 3 wherein said magnetic biasing means comprises magnetic substance and a magnet one of which is secured to the lower surface of said turntable and the other of which is provided below said turntable,and a yoke plate secured to said magnet, a part of said yoke plate being positioned on the lateral side of said magnetic substance.

11. A device for preventing vibration of a disc motor shaft as defined in claim 3 wherein said magnetic biasing means comprises a magnet secured to the lower surface of said turntable, another magnet provided below said turntable in such a manner that said magnets attract each other and a yoke plate secured to one of said magnets, a part of said yoke plate being positioned on the lateral side of said magnetic substance.

12. A device for preventing vibration of a disc motor shaft as defined in claim 1 wherein the magnetic force generated by said magnetic biasing means has an axial component and a radial component with respect to the motor shaft.

13. A device for preventing vibration of a disc motor as defined in claim 1 wherein the motor has at least one bearing and wherein the biasing means biases the shaft against the bearing.

14. A device for preventing vibration of a disc motor shaft in a disc playback device comprising:
   a disc motor having a disc motor shaft;
   a turntable fixedly connected to said disc motor shaft for placing a disc thereon; and
   magnetic biasing means for generating a magnetic force biasing said disc motor shaft in a radial and an axial direction with respect to said disc motor shaft, wherein said magnetic biasing means comprises a magnetic substance and a magnet one of which is secured to the lower surface of said turntable and the other of which is provided below said turntable, and a yoke plate secured to said magnet, a part of said yoke plate being positioned on the lateral side of said magnetic substance.

* * * * *